US011959554B2

(12) United States Patent
Jeong

(10) Patent No.: US 11,959,554 B2
(45) Date of Patent: Apr. 16, 2024

(54) THREE-WAY SOLENOID VALVE

(71) Applicant: HYUNDAI MOBIS Co., Ltd., Seoul (KR)

(72) Inventor: Seung Hwan Jeong, Seoul (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/537,820

(22) Filed: Nov. 30, 2021

(65) Prior Publication Data
US 2023/0110078 A1 Apr. 13, 2023

(30) Foreign Application Priority Data

Oct. 8, 2021 (KR) .......................... 10-2021-0134333

(51) Int. Cl.
*F16K 11/10* (2006.01)
*F16K 11/24* (2006.01)
(Continued)

(52) U.S. Cl.
CPC ............ *F16K 11/24* (2013.01); *F16K 11/105* (2013.01); *F16K 31/0637* (2013.01); *F16K 27/0245* (2013.01); *Y10T 137/86919* (2015.04)

(58) Field of Classification Search
CPC ............ F16K 31/0662; F16K 31/0665; F16K 15/1823; F16K 15/1843; F16K 11/24;
(Continued)

(56) References Cited

U.S. PATENT DOCUMENTS 856,010 A * 6/1907 Wikander ............. B60T 13/665
137/627.5
906,331 A * 12/1908 Coe et al. ............. H01F 7/1607
137/625.27
(Continued)

FOREIGN PATENT DOCUMENTS

DE 4441150 A1 5/1996
DE 102007010213 B3 8/2008
(Continued)

OTHER PUBLICATIONS

Office Action issued in German Patent application 102021134595.2 dated May 12, 2022.
(Continued)

*Primary Examiner* — Craig J Price
(74) *Attorney, Agent, or Firm* — Morgan, Lewis & Bockius LLP

(57) ABSTRACT

A three-way solenoid valve comprising: a valve block including a valve chamber and a first port, a second port, and a third port fluidly communicating with the valve chamber; an armature; a body; a plunger; and a flow path control assembly that is disposed inside the second body and includes a first opening/closing flow path, which allows the first port and the second port to fluidly communicate with each other or to be blocked from each other according to a magnitude of a force applied by the plunger, and a second opening/closing flow path which allows the second port and the third part to fluidly communicate with each other or to be blocked from each other according to the magnitude of the force applied by the plunger.

13 Claims, 12 Drawing Sheets

(51) Int. Cl.
*F16K 31/06* (2006.01)
*F16K 27/02* (2006.01)

(58) Field of Classification Search
CPC .. F16K 11/105; F16K 31/0631; F16K 27/048; F16K 27/029; F16K 27/0263; F16K 27/0245; B60T 8/363; B60T 8/364; B60T 8/3635; B60T 8/5093; B60T 8/365; B60T 8/5025; B60T 8/3615; B60T 8/3655; B60T 8/366; B60T 8/5081; B60T 8/5075; B60T 8/5087; B60T 15/025; B60T 15/028; B60T 13/66; B60T 13/68; B60T 13/686; B60T 13/662; B60T 13/665; Y10T 137/86919; Y10T 137/86718; Y10T 137/86936
USPC ........ 137/627.5, 625.37, 625.3, 596.17, 901, 137/625.48–625.5; 303/119.1–119.3, 303/113.1, 115.2; 251/129.02, 129.05, 251/129.07, 129.08, 129.14; 91/446, 459, 91/465
See application file for complete search history.

(56) References Cited

U.S. PATENT DOCUMENTS

| | | | | |
|---|---|---|---|---|
| 925,673 A * | 6/1909 | Zook | F16K 31/10 | 137/596.17 |
| 3,874,406 A * | 4/1975 | von Loewis of Menar | | B60T 8/362 137/596.1 |
| 4,606,705 A * | 8/1986 | Parekh | F04B 27/1804 | 417/270 |
| 5,071,321 A * | 12/1991 | Skinner | F04B 27/1804 | 417/270 |
| 5,234,031 A * | 8/1993 | Pickett | B60T 8/5037 | 303/119.2 |
| 5,299,859 A * | 4/1994 | Tackett | B60T 8/445 | 303/119.2 |
| 5,454,292 A * | 10/1995 | Oudelaar | B60J 7/1273 | 91/446 |
| 5,567,023 A * | 10/1996 | Yoo | B60T 8/364 | 303/119.2 |
| 5,577,815 A * | 11/1996 | Hashida | B60T 8/489 | 303/119.2 |
| 5,702,235 A * | 12/1997 | Hirota | F04B 27/1804 | 417/270 |
| 5,752,689 A * | 5/1998 | Barkhimer | F02D 19/10 | 335/262 |
| 5,934,766 A * | 8/1999 | Feigel | B60T 8/364 | 303/119.2 |
| 6,010,312 A * | 1/2000 | Suitou | F04B 27/1804 | 417/222.2 |
| 6,189,983 B1 * | 2/2001 | Volz | B60T 15/028 | 303/119.2 |
| 6,321,767 B1 * | 11/2001 | Seid | F16K 31/0613 | 137/596.2 |
| 6,719,267 B2 * | 4/2004 | Torii | B60T 8/363 | 137/596.17 |
| 6,808,160 B2 * | 10/2004 | Hayakawa | F16K 31/0689 | 303/119.2 |
| 6,846,049 B2 * | 1/2005 | Obersteiner | B60T 8/363 | 303/119.2 |
| 6,874,533 B2 * | 4/2005 | Weber | F15B 13/0405 | 137/596.17 |
| 7,021,256 B2 * | 4/2006 | Wagner | F16K 31/0637 | 123/90.11 |
| 7,210,502 B2 * | 5/2007 | Fuller | F16K 99/0001 | 251/30.01 |
| 7,673,597 B2 * | 3/2010 | Najmolhoda | F15B 21/041 | 123/90.12 |
| 9,016,663 B2 * | 4/2015 | Moreno | F16K 31/0675 | 251/129.15 |
| 9,346,447 B2 * | 5/2016 | Lee | B60T 8/363 | |
| 9,371,932 B2 * | 6/2016 | Ando | F16K 31/0637 | |
| 10,746,064 B2 * | 8/2020 | Höglund | F16K 31/0634 | |
| 10,801,638 B2 * | 10/2020 | Hilzendegen | F15B 13/0402 | |
| 11,542,931 B2 * | 1/2023 | Hayama | G05D 7/005 | |
| 2004/0090296 A1 * | 5/2004 | Ojima | G05D 16/2024 | 335/256 |
| 2004/0256012 A1 * | 12/2004 | Bruck | G05D 16/2024 | 137/625.65 |
| 2006/0076825 A1 * | 4/2006 | Sanada | B60T 8/3675 | 303/119.3 |
| 2009/0121541 A1 * | 5/2009 | Lee | B60T 8/363 | 303/119.2 |
| 2015/0291143 A1 * | 10/2015 | Jeon | F16K 15/00 | 137/601.2 |
| 2022/0212649 A1 * | 7/2022 | Jeong | B60T 13/686 | |
| 2022/0348179 A1 * | 11/2022 | Jeong | B60T 15/028 | |
| 2023/0141694 A1 * | 5/2023 | Ahn | B60T 15/028 | 303/6.01 |

FOREIGN PATENT DOCUMENTS

| | | |
|---|---|---|
| DE | 102015004613 A1 | 10/2015 |
| JP | 11-511708 A | 10/1999 |
| KR | 10-2009-0077207 A | 7/2009 |

OTHER PUBLICATIONS

Korean Office Action dated Apr. 24, 2023, issued in corresponding Korean Patent Application No. 10-2021-0134333 (with English tranlsation).

* cited by examiner

THREE-WAY SOLENOID VALVE

CROSS-REFERENCE TO RELATED APPLICATION

This application claims priority to and the benefit of Korean Patent Application No. 10-2021-0134333 filed on Oct. 8, 2021, the disclosure of which is incorporated herein by reference in its entirety.

BACKGROUND

1. Field of the Invention

The present disclosure relates to a three-way solenoid valve.

2. Discussion of Related Art

Contents described in this section merely provide background information on the present disclosure and do not constitute the related art.

A normal open-type solenoid valve refers to a solenoid valve of which a flow path is open when no current is applied. A normal closed-type solenoid valve refers to a solenoid valve of which a flow path is closed when no current is applied. A vehicular hydraulic braking device selectively transmits a working fluid to a plurality of wheel braking mechanisms by controlling opening and closing states of a plurality of solenoid valves.

FIG. 1 is a schematic block diagram illustrating a hydraulic circuit of a vehicular braking system according to the related art. Referring to FIG. 1, the working fluid is supplied from a braking device 1 to an inlet valve 3 and an outlet valve 5. Here, the inlet valve 3 is a normal open-type solenoid valve, and the outlet valve 5 is a normal closed-type solenoid valve. A check valve 4 that allows the working fluid to flow only from a wheel cylinder toward the braking device 1 is disposed in the inlet valve 3. When the hydraulic pressure supplied from the wheel cylinder is reduced, the outlet valve 5 is opened to discharge the working fluid of the wheel cylinder toward the braking device 1. The normal open-type inlet valve 3, the normal closed-type outlet valve 5, and the check valve 4 are mounted on the vehicular hydraulic braking device. Since such a hydraulic braking device includes a plurality of solenoid valves, the manufacturing cost is high and the volume is large.

In order to solve the above problem, a three-way solenoid valve designed to perform all functions of an inlet valve, an outlet valve, and a check valve has been proposed. The three-way solenoid valve has a single body, and the body has three flow paths along a lengthwise direction of the valve. Thus, the hydraulic braking device including the three-way solenoid valve has advantages in that the manufacturing cost is low and the volume is small as compared to a general hydraulic braking device.

However, the hydraulic braking device including the three-way solenoid valve still has problems in that the length is long and the shape is complicated.

SUMMARY OF THE INVENTION

A three-way solenoid valve according to one embodiment serves as an inlet valve and an outer valve, thereby reducing the manufacturing cost and the volume of a hydraulic braking device.

The three-way solenoid valve according to one embodiment includes two bodies, thereby reducing the manufacturing cost and the volume of the hydraulic braking device.

The aspects of the present disclosure are not limited to the aspects described above, and those skilled in the art will clearly understand other aspects not described from the following description.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

In the present disclosure, terms such as "upper side" or "lower side" are used with reference to the accompanying drawings.

Figure 1:
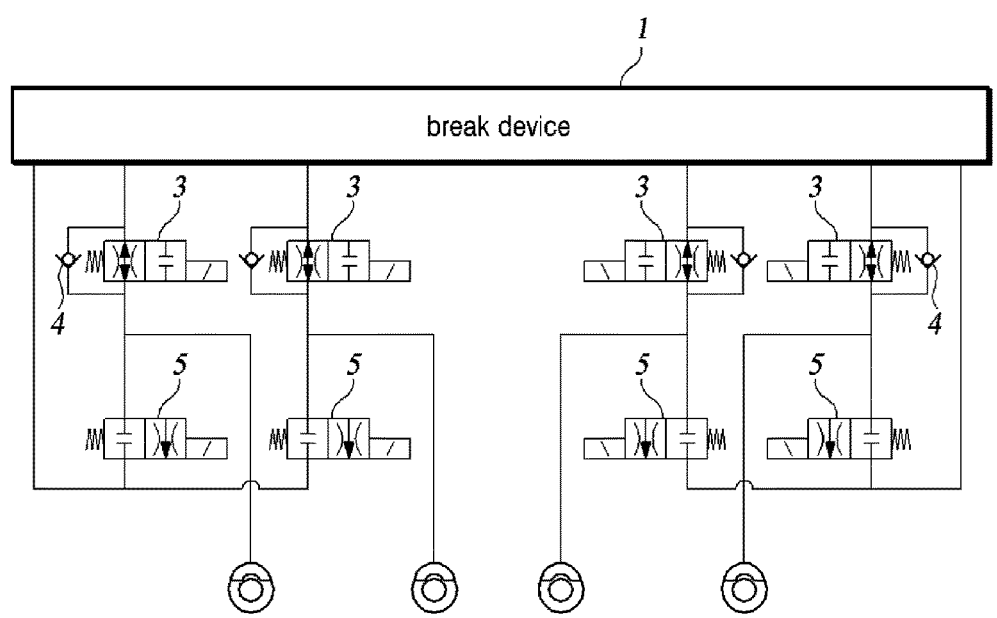
FIG. 1 is a schematic block diagram illustrating a hydraulic circuit of a vehicular braking system according to the related art.
Figure 2:
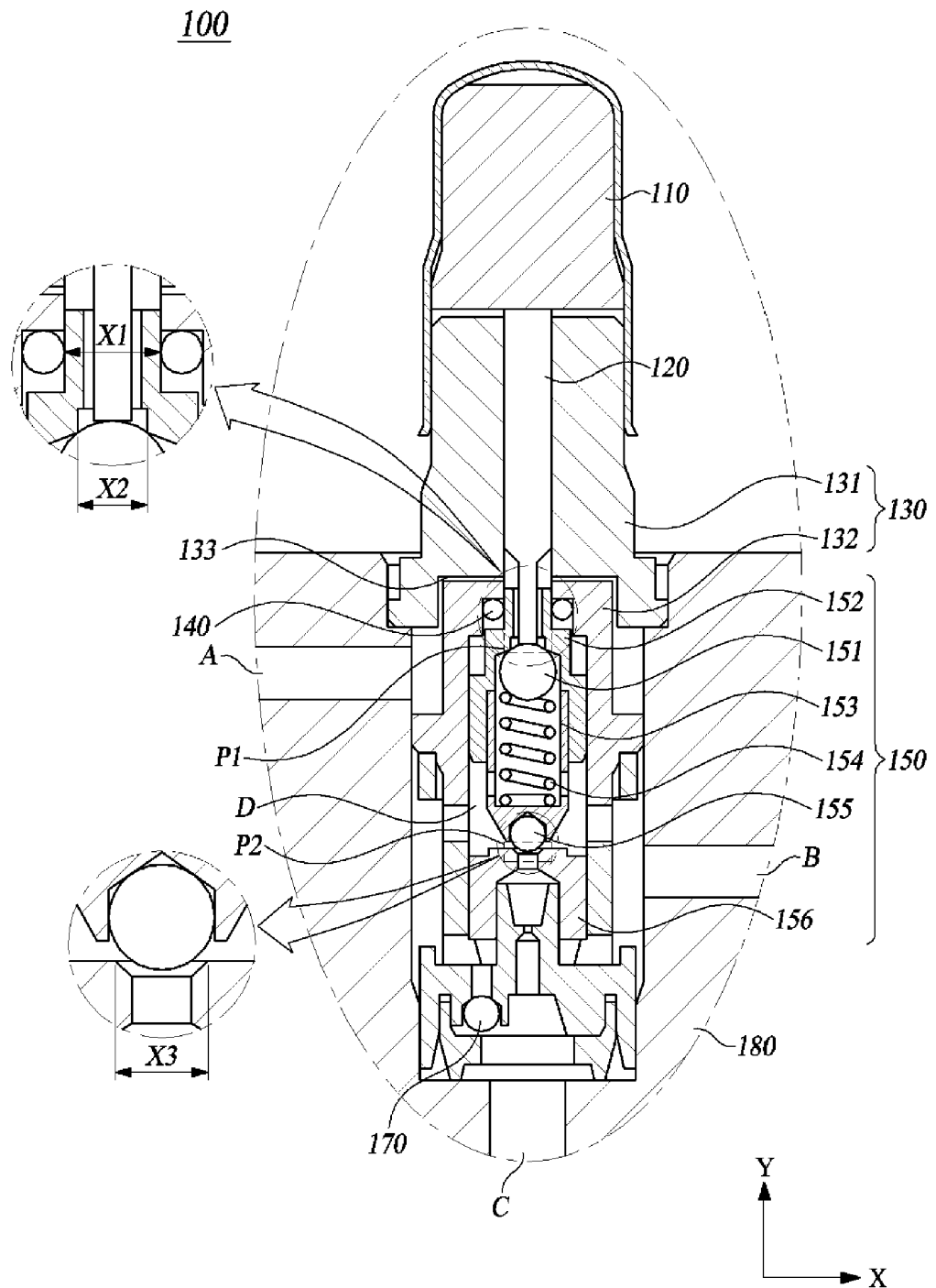
FIG. 2 is a cross-sectional view of a 3-way solenoid valve according to a first embodiment of the present disclosure.

FIG. 2 is a cross-sectional view of a three-way solenoid valve according to a first embodiment of the present disclosure. In the present disclosure, a lengthwise direction of the three-way solenoid valve is referred to as a Y-axis direction. Among directions illustrated in the drawings, an upward direction is referred to as a "positive Y direction", and a downward direction is referred to as a "negative Y direction".

Referring to FIG. 2, a three-way solenoid valve 100 according to the first embodiment includes the entirety or some of an armature 110, a plunger 120, a body 130, a sealing member 140, a flow path control assembly 150, a check valve 170, and a valve block 180.

The armature 110 is configured to form an electromagnetic force. A coil may be disposed to surround the outer circumferential surface of the armature 110, and the armature 110 may form the electromagnetic force corresponding to a current applied to the coil. The electromagnetic force formed by the armature 110 acts on the armature 110 to move the armature 110 toward a first body 131. As the electromagnetic force formed in the armature 110 increases, the armature 110 and the first body 1331 become closer to each other. Hereinafter, the electromagnetic force formed by the armature 110 is simply referred to as an "electromagnetic force."

The body 130 includes the first body 131 and a second body 132. The first body 131 is disposed so that one side thereof faces the armature 110 and has a hollow therein. The second body 132 is disposed so that one side thereof faces the other side of the first body 131 and has a hollow therein. The plunger 120 may slide in a hollow of the body 130 and linearly move in the Y-axis direction. A groove formed in a lower end of the first body 131, and an upper surface of the second body 132 may form an outer peripheral surface of a flow path connecting a first port A, a second port B, or a third port C and the hollow inside the second body 132. In the present disclosure, the flow path connecting the first port A, the second port B, or the third port C and the hollow inside the second body 132 is referred to as a discharge flow path 133. Unlike this, a groove formed in an upper end of the second body 132, and a lower surface of the second body 132 may be configured to connect the first port A, the second port B, or the third port C and the hollow inside the second body 132. A groove portion 131a formed to be concave upward is formed in a lower surface of the first body 131, and at least a portion of the second body 132 is accommodated in the groove portion 131a. The three-way solenoid valve 100 has a shorter length and a simpler shape than a general three-way solenoid valve, thereby reducing the volume of a braking device and reducing the manufacturing cost. A flange portion 131b is formed on the lower end of the first body 131. By fixing the flange portion 131b to a bore formed in the valve block 180, the three-way solenoid valve 100 may be stably fixed to the valve block 180.

At least a portion of the plunger 120 is configured to pass through the hollow inside the first body 131 and the hollow inside the second body 132. One end of the plunger 120 faces the armature 110. The plunger 120 and the armature 110 may share a central line thereof and have a cylindrical shape, and the plunger 120 may be disposed in contact with a lower surface of the armature 110. The other end of the plunger 120 faces the flow path control assembly 150. The flow path control assembly 150 may include a first fluid control unit 151 that opens or closes a first opening/closing flow path P1, and a lower surface of the plunger 120 may be disposed to face the first fluid control unit 151. The plunger 120 is configured so that one end thereof is pressed and moved by the armature 110. As the armature 110 moves toward the first body 131 by the electromagnetic force, the plunger 120 is pressed in the negative Y direction. When the plunger 120 is pressed in the negative Y direction, the first fluid control unit 151 is pressed in the negative Y direction. Hereinafter, a force with which the plunger 120 presses the first fluid control unit 151 is referred to as a pressing force.

A lower end of the plunger 120 may be disposed to pass through a portion of the flow path control assembly 150. A first elastic part 154 is disposed inside the flow path control assembly 150. Due to this disposition, when the armature 110 presses the plunger 120, the plunger 120 may press the first elastic part 154. The plunger 120 applies, to the first elastic part 154, a pressing force corresponding to the electromagnetic force formed by the armature 110. A cross-sectional area of a lower portion of the plunger 120 may be formed to be smaller than a cross-sectional area of an upper portion of the plunger 120 so that the plunger 120 passes through a portion of the flow path control assembly 150. Here, the cross-sectional area refers to a cross-sectional area of a plane perpendicular to a Y axis.

The sealing member 140 is disposed between the flow path control assembly 150 and the second body 132. The sealing member 140 is pressed against an outer circumferential surface of an upper housing 152 and an inner circumferential surface of the second body 132 to prevent fluid from flowing between the flow path control assembly 150 and the second body 132. The fluid may only move through a space formed inside the flow path control assembly 150.

The flow path control assembly 150 is disposed inside the second body 132. The flow path control assembly 150 includes the entirety or some of the first fluid control unit 151, housings 152 and 153, the first elastic part 154, a second fluid control unit 155, and a valve seat 156.

The flow path control assembly 150 includes the first opening/closing flow path P1 configured to allow the first port A and the second port B to fluidly communicate with each other or to be blocked from each other according to the magnitude of the electromagnetic force. The first opening/closing flow path P1 may be a space between an opening of the upper housing 152 and the first fluid control unit 151.

The flow path control assembly 150 includes a second opening/closing flow path P2 configured to block flow of the fluid between the second port B and the third port C or supply the fluid according to the magnitude of the electromagnetic force. The second opening/closing flow path P2 may be a space between a hollow portion of the valve seat 156 and the second fluid control unit 155.

The flow path control assembly 150 is configured to control opening or closing of the first opening/closing flow path P1 and the second opening/closing flow path P2 according to the magnitude of the electromagnetic force. The first fluid control unit 151 is configured to open or close the first opening/closing flow path P1 according to the magnitude of the pressing force. The first fluid control unit 151 is disposed inside the flow path control assembly 150 to be in contact with the lower end of the plunger 120 and an upper end of the first elastic part 154. When the plunger 120 is pressed by the armature 110, the first fluid control unit 151 in contact with the lower end of the plunger 120 is pressed by the plunger 120 in the negative Y direction. When the plunger 120 presses the first fluid control unit 151 with a sufficient force, the first fluid control unit 151 moves toward the first elastic part 154, and thus the first opening/closing flow path P1 is opened. The first fluid control unit 151 may be formed in a sphere shape as illustrated in FIG. 2, but the present disclosure is not limited thereto, and it is sufficient that the first fluid control unit 151 is disposed inside the housings 152 and 153 to close the first opening/closing flow path P1.

The housings 152 and 153 have side surfaces fixed to the inside of a valve chamber D and linearly move in the Y-axis direction. The fluid outside the housings 152 and 153 may flow into a through hole inside the housings 152 and 153 through orifices formed in the housings 152 and 153. Openings are formed in upper portions of the housing 152 and 153 so that a portion of the plunger 120 may pass therethrough. The housing 152 and 153 may include the upper housing 152 and the lower housing 153 as illustrated in FIG. 2 but may be integrally formed.

The first elastic part 154 may be disposed inside the housings 152 and 153 and have one end in contact with the first fluid control unit 151 and the other end in contact with lower surfaces of the housings 152 and 153. The first elastic part 154 may provide an elastic force to the first fluid control unit 151 and the lower housing 153. The magnitude of the elastic force of the first elastic part 154 corresponds to the magnitude of the pressing force. When the first elastic part 154 is pressed by the first fluid control unit 151 in the negative Y direction, the housings 152 and 153 are pressed in the negative Y direction.

The second fluid control unit 155 may be disposed at an outer lower end of the housing 152 and 153. The valve seat 156 is disposed at a lower end of the second fluid control unit 155. A hollow part through which the fluid flows is formed in the center of the valve seat 156. As the second fluid control unit 155 moves in the Y-axis direction from an upper end of the valve seat 156, the second opening/closing flow path P2 is opened or closed.

The three-way solenoid valve 100 according to one embodiment of the present disclosure includes the check valve 170 that allows the fluid to flow only in one direction. In detail, the check valve 170 allows the fluid to flow only from the second port B toward the third port C. The check valve 170 may be disposed at a lower portion of the three-way solenoid valve 100.

Figure 12:
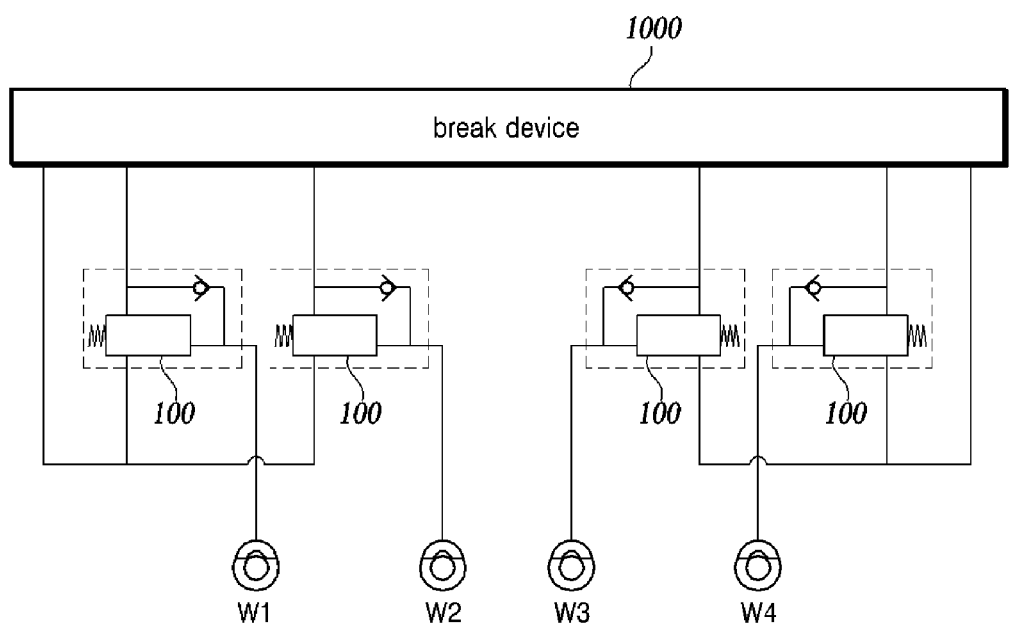
FIG. 12 is a schematic block diagram illustrating a hydraulic circuit including a three-way solenoid valve according to one embodiment of the present disclosure.

FIG. 12 is a schematic block diagram illustrating a hydraulic circuit including a three-way solenoid valve according to one embodiment of the present disclosure.

The valve block 180 includes the valve chamber D, the first port A, the second port B, and the third port C. The first port A, the second port B, and the third port C fluidly communicate with the valve chamber D. Referring to FIG. 12, a braking device 1000 may include an accumulator (not illustrated), a reservoir (not illustrated), and a pressurizer (not illustrated). Here, the first port A may be an inlet or an outlet of a flow path connected to the accumulator or the reservoir. When the hydraulic pressure in the wheel cylinder W1, W2, W3, or W4 is reduced, the fluid flows from the second port B toward the first port A.

The second port B may be an inlet or outlet of a flow path connected to the wheel cylinder W1, W2, W3, or W4 mounted on a wheel of a vehicle.

The third port C may be an inlet or outlet of a flow path connected to the pressurizer. In general, when the hydraulic pressure in the wheel cylinder W1, W2, W3, or W4 is increased, the fluid flows from the third port C toward the second port B. Here, the pressurizer may be a master cylinder or a motor pump.

As illustrated in FIG. 2, the first port A and the second port B may be formed on a side surface of the three-way solenoid valve 100. The third port C may be formed at a lower portion of the three-way solenoid valve 100. However, the first to third ports A, B, and C of the present disclosure are not limited to the configuration and connection relationship described above. The fluid flowing into a portion of the first to third ports A, B, and C flows into another portion of the first to third ports A, B, and C via the valve chamber D.

In FIG. 2, an area surrounded by the sealing member 140 is referred to as a first area X1. A cross-sectional area of the first opening/closing flow path P1 sealed by the first fluid control unit 151 is referred to as a second area X2. A cross-sectional area of the second opening/closing flow path P2 sealed by the second fluid control unit 155 is referred to as a third area X3.

The armature 110 is configured to form a first electromagnetic force, a second electromagnetic force that is greater than the first electromagnetic force, and a third electromagnetic force that is greater than the second electromagnetic force, and by adjusting the magnitude of the electromagnetic force formed in the armature 110, opening/closing states of the first opening/closing flow path P1 and the second opening/closing flow path P2 are adjusted according to the electromagnetic force formed in the armature 110. Here, the first to third electromagnetic forces have preset values, which may be experimentally obtained and stored in a memory of a controller in the form of a lock-up table (LUT). The first to third electromagnetic forces may have values determined within a predetermined range. The second electromagnetic force is greater than the first electromagnetic force, and the third electromagnetic force is greater than the second electromagnetic force.

Hereinafter, in the description of FIGS. 3 to 6, the first port A is defined as a port directly/indirectly connected to the accumulator or reservoir, the second port B is defined as a port directly/indirectly connected to the wheel cylinder W1, W2, W3, or W4, and the third port C is defined as a port directly/indirectly connected to the pressurizer.

Figure 3:
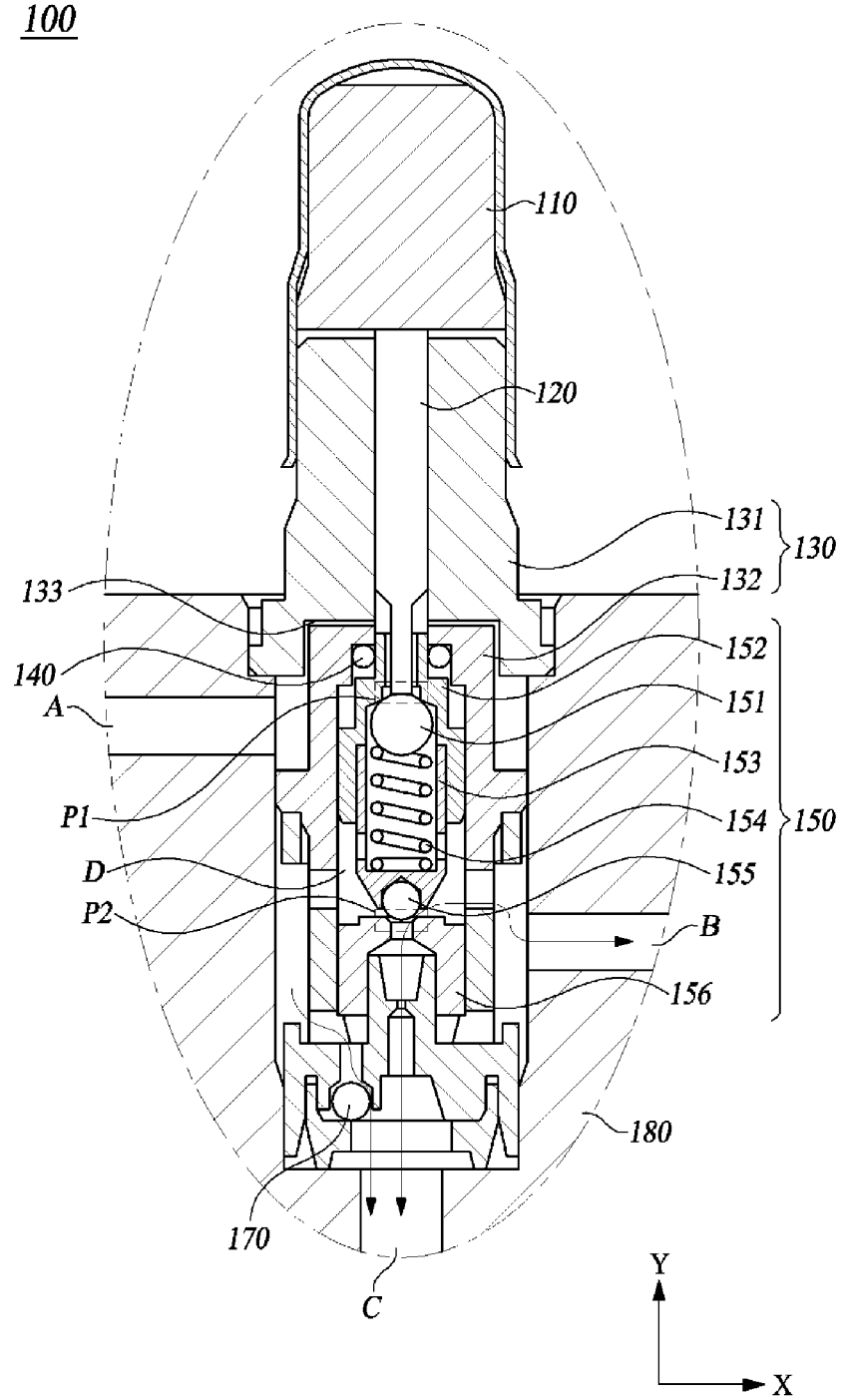
FIG. 3 is a cross-sectional view for explaining the flow of a fluid when electromagnetic force is not formed in the armature of the 3-way solenoid valve according to the first embodiment of the present disclosure.

Referring to FIG. 3, when the electromagnetic force is not formed in the armature 110, the armature 110 does not press the plunger 120. When the armature 110 does not press the plunger 120, the first opening/closing flow path P1 may be opened due to a pressure difference between the second and third ports B and C and the first port A. In detail, when the electromagnetic force is not formed in the armature 110, the armature 110 does not move toward the first body 131. Thus, the plunger 120 does not press the flow path control assembly 150. In this case, the first fluid control unit 151 is pressed upward by the elastic force of the first elastic part 154 to close the first opening/closing flow path P1.

The fluid flowing into the second port B and the third port C presses the first area X1 in the positive Y direction to open the second opening/closing flow path P2. The fluid pressed inside the pressurizer sequentially passes through the second opening/closing flow path P2 and the second port B and is transferred to the wheel cylinder W1, W2, W3, or W4. When the pressure of the pressurizer is released, the second opening/closing flow path P2 is opened, the fluid flows from the second port B toward the third port C, and thus the pressure of the wheel cylinder W1, W2, W3, and W4 is reduced. When the fluid flows from the second port B toward the third port C, the fluid may also flow through the check valve 170.

In general, in a vehicular braking system, an inlet valve is a normal open-type in which the flow path is opened when no current is applied, and an outlet valve is a normal closed-type in which the flow path is closed when no current is applied.

In the three-way solenoid valve 100 according to the first embodiment of the present disclosure, when no current is applied, the second opening/closing flow path P2 between the second port B and the third port C is opened, and the first opening/closing flow path P1 between the first port A and the second port B is closed. The three-way solenoid valve 100 according to the first embodiment of the present disclosure functions as a normal open-type inlet valve and a normal closed-type outlet valve according to the related art. The check valve 170 allows the fluid to flow only from the second port B toward the third port C, which instead serves as a check valve disposed in the inlet valve according to the related art.

Figure 4:
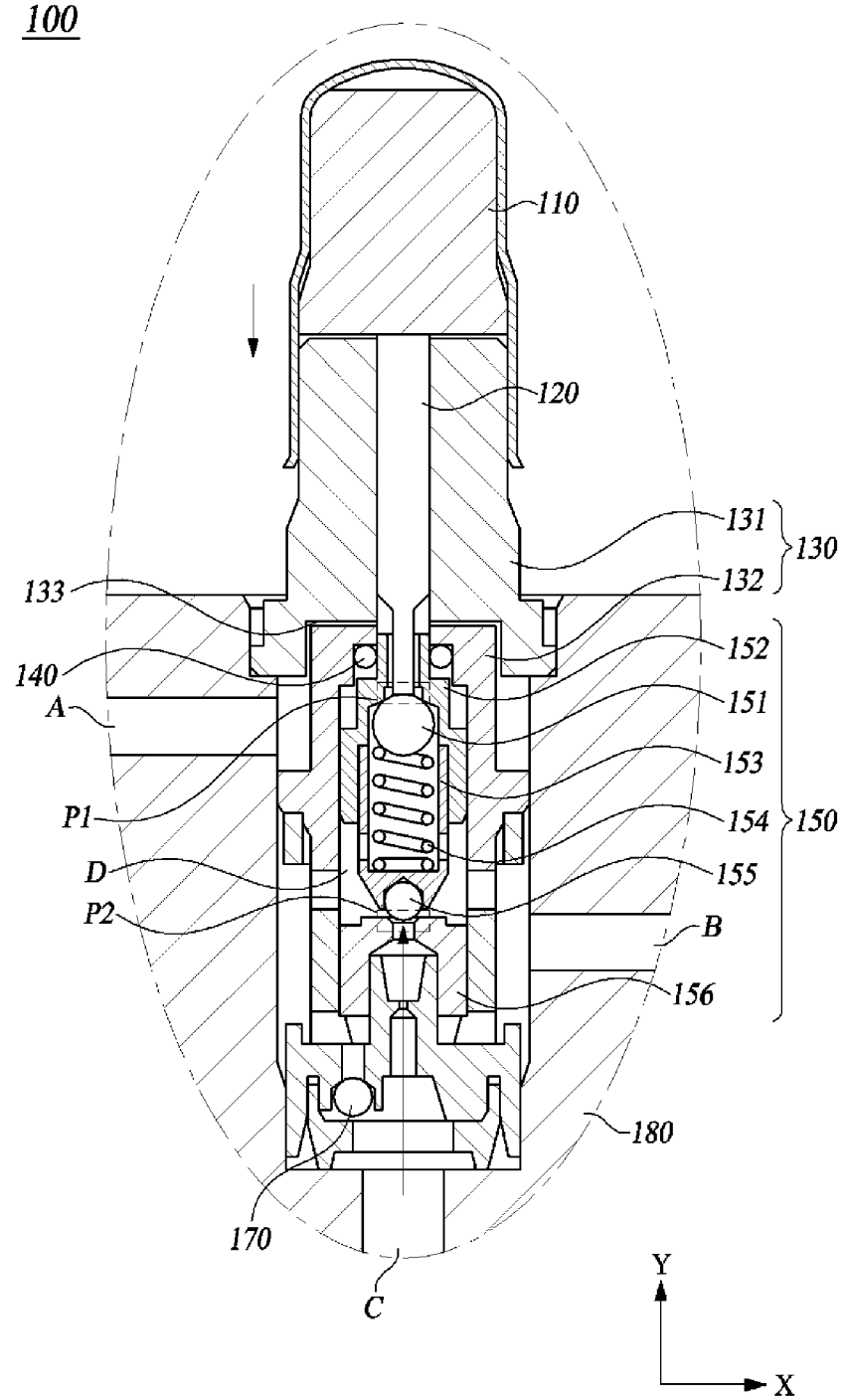
FIG. 4 is a cross-sectional view for explaining the flow of a fluid when a second electromagnetic force is formed in the armature of the 3-way solenoid valve according to the first embodiment of the present disclosure.

Referring to FIG. 4, when the armature 110 presses the plunger 120 using the second electromagnetic force, the first opening/closing flow path P1 and the second opening/closing flow path P2 are closed. The armature 110 presses the plunger 120 using a force corresponding to the second electromagnetic force. Here, the force corresponding to the second electromagnetic force may have the same magnitude as the second electromagnetic force. The second electromagnetic force is set to be greater than the sum of a force that is applied to the flow path control assembly 150 by the fluid flowing into the third port C and a force that is applied to the flow path control assembly 150 by the fluid flowing into the second port B. Here, the force that is applied to the flow path control assembly 150 by the fluid flowing into the third port C is caused by a pressure applied to the third area X3 by the fluid flowing into the third port C. The force applied to the flow path control assembly 150 by the fluid flowing into the second port B is caused by a pressure applied to the first area X1 by the fluid flowing into the second port B and a pressure applied to the third area X3 by the fluid flowing into the second port B. In addition, the second electromagnetic force is set to be smaller than a force obtained by adding a force applied to the second area X2 by the fluid flowing into the second port B and the elastic force of the first elastic part 154.

The armature 110, in which the second electromagnetic force is formed, indirectly presses the second fluid control unit 155 to close the second opening/closing flow path P2. A force with which the armature 110 in which the second electromagnetic force is formed presses the first elastic part 154 is not large enough to deform the first elastic part 154, and thus the first opening/closing flow path P1 is also closed. Here, the indirect pressing by the armature 110 means that, due to the electromagnetic force of the armature 110, the plunger 120 moves in the negative Y direction, and the plunger 120 presses a configuration of the flow path control assembly 150. When the second electromagnetic force is applied to the armature 110, an interval between the armature 110 and the first body 131 is reduced.

When the second electromagnetic force is formed in the armature 110, the second opening/closing flow path P2 is closed, and thus the hydraulic pressure formed in the pressurizer is not transferred to the wheel cylinder W1, W2, W3, or W4. Since the first opening/closing flow path P1 is also closed, the fluid of the wheel cylinder W1, W2, W3, or W4 is not transferred to the accumulator. Accordingly, when the second electromagnetic force is formed in the armature 110, the hydraulic pressure inside the wheel cylinder W1, W2, W3, or W4 is maintained. The flow path connection state illustrated in FIG. 4 corresponds to a flow path connection state when both the inlet valve and the outlet valve are closed in a general vehicular braking device. In order to maintain a braking pressure formed by the wheel cylinder W1, W2, W3, or W4, the three-way solenoid valve 100 may be driven as illustrated in FIG. 4.

Figure 5:
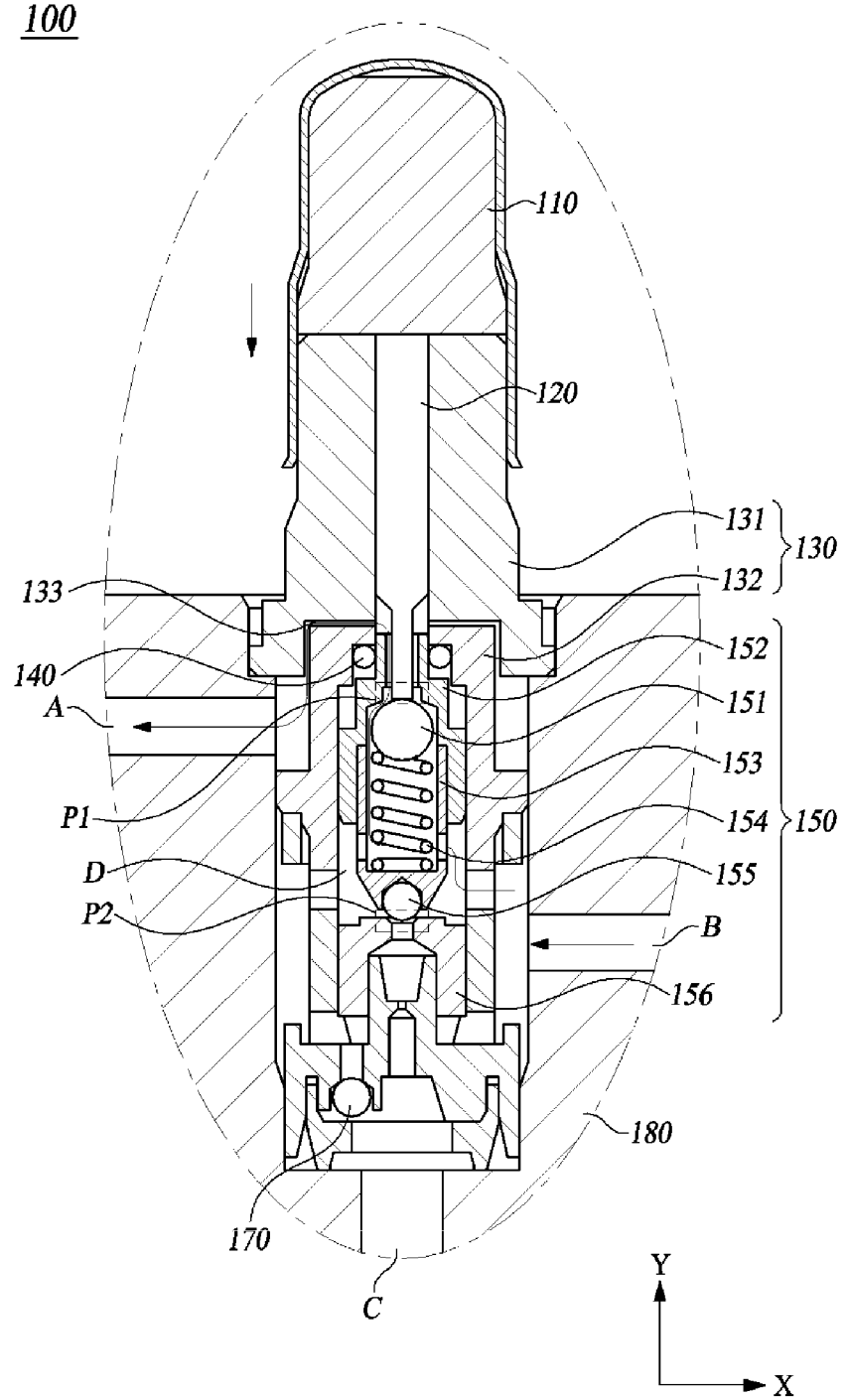
FIG. 5 is a cross-sectional view for explaining the flow of a fluid when a third electromagnetic force is formed in the armature of the 3-way solenoid valve according to the first embodiment of the present disclosure.

Referring to FIG. 5, the armature 110 presses the plunger 120 using the third electromagnetic force, the first opening/closing flow path P1 is opened, and the second opening/closing flow path P2 is closed. The third electromagnetic force is set to be greater than a force obtained by adding a force applied to the second area X2 by the fluid flowing into the second port B and the elastic force of the first elastic part 154. The armature 110, in which the third electromagnetic force is formed, indirectly presses the second fluid control unit 155 to close the second opening/closing flow path P2. In addition, the armature 110 indirectly presses the first elastic part 154 to compress the first elastic part 154. As the first elastic part 154 is compressed, the first opening/closing flow path P1 is opened.

When the third electromagnetic force is formed in the armature 110, the second opening/closing flow path P2 is closed, and thus the hydraulic pressure formed in the pressurizer is not transferred to the wheel cylinder W1, W2, W3, or W4. Since the first opening/closing flow path P1 is opened, the fluid inside the wheel cylinder W1, W2, W3, or W4 sequentially passes through the second port B and the first port A and is transferred to the accumulator or the reservoir. Accordingly, when the third electromagnetic force is formed in the armature 110, the hydraulic pressure inside the wheel cylinder W1, W2, W3, or W4 is reduced. The flow path connection state illustrated in FIG. 5 corresponds to a flow path connection state when the inlet valve is closed and the outlet valve is opened in the general vehicular braking device. In order to reduce the braking pressure supplied to the wheel cylinder W1, W2, W3, or W4, the three-way solenoid valve 100 may be driven as illustrated in FIG. 5.

Figure 6:
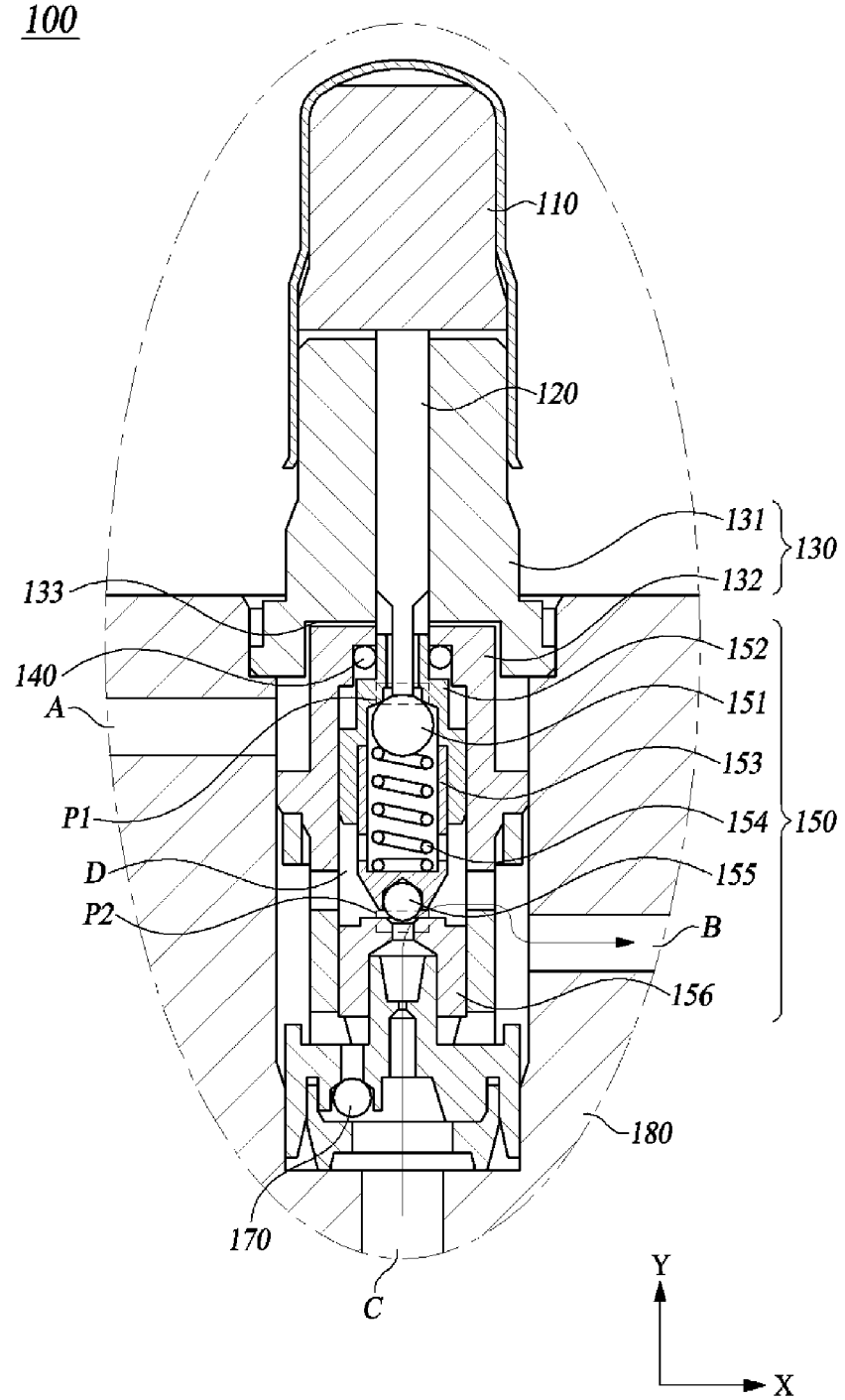
FIG. 6 is a cross-sectional view for explaining the flow of a fluid when a first electromagnetic force is formed in the armature of the 3-way solenoid valve according to the first embodiment of the present disclosure.

Referring to FIG. 6, when the armature 110 presses the plunger 120 using the first electromagnetic force, the first opening/closing flow path P1 is closed and the second opening/closing flow path P2 is opened. The armature 110 presses the plunger 120 with a force corresponding to the first electromagnetic force. The first electromagnetic force is smaller than the second electromagnetic force. The first opening/closing flow path P1 is closed. A force with which the armature 110 indirectly presses the second fluid control unit 155 is lower than a force applied to the second fluid control unit 155 by the fluid flowing into the third port C. Thus, the second opening/closing flow path P2 is partially opened, and the fluid flows from the third port C to the second port B. When the first electromagnetic force is formed in the armature 110, the second opening/closing flow path P2 is partially opened, and thus the fluid pressed by the pressurizer sequentially passes through the third port C and the second port B and is transferred to the wheel cylinder W1, W2, W3, or W4. Since the first opening/closing flow path P1 is closed, the hydraulic pressure inside the wheel cylinder W1, W2, W3, or W4 is not transferred to the accumulator. Accordingly, when the first electromagnetic force is the coil, the hydraulic pressure inside the wheel cylinder W1, W2, W3, or W4 is increased. The flow path connection state illustrated in FIG. 6 corresponds to a flow path connection state when the inlet valve is opened and the outlet valve is closed in the general vehicular braking device. In order to increase the hydraulic pressure inside the wheel cylinder W1, W2, W3, or W4, the three-way solenoid valve 100 may be driven as illustrated in FIG. 6.

When the three-way solenoid valve 100 is driven as illustrated in FIG. 6, the pressure of the wheel cylinder W1, W2, W3, or W4 increases sharply, and thus a wheel-slip phenomenon or a wheel-lock phenomenon may occur. In order to prevent the wheel-slip phenomenon or the wheel-lock phenomenon, the first electromagnetic force corresponding to a force just before the first opening/closing flow path P1 is opened is formed in the armature 110, and thereafter, the first electromagnetic force is linearly reduced to partially open the second opening/closing flow path P2.

In the three-way solenoid valve 100 according to one embodiment of the present disclosure, as a current applied to the coil continuously changes, the amount of fluid flowing between the first to third ports A, B, and C changes.

Figure 7:
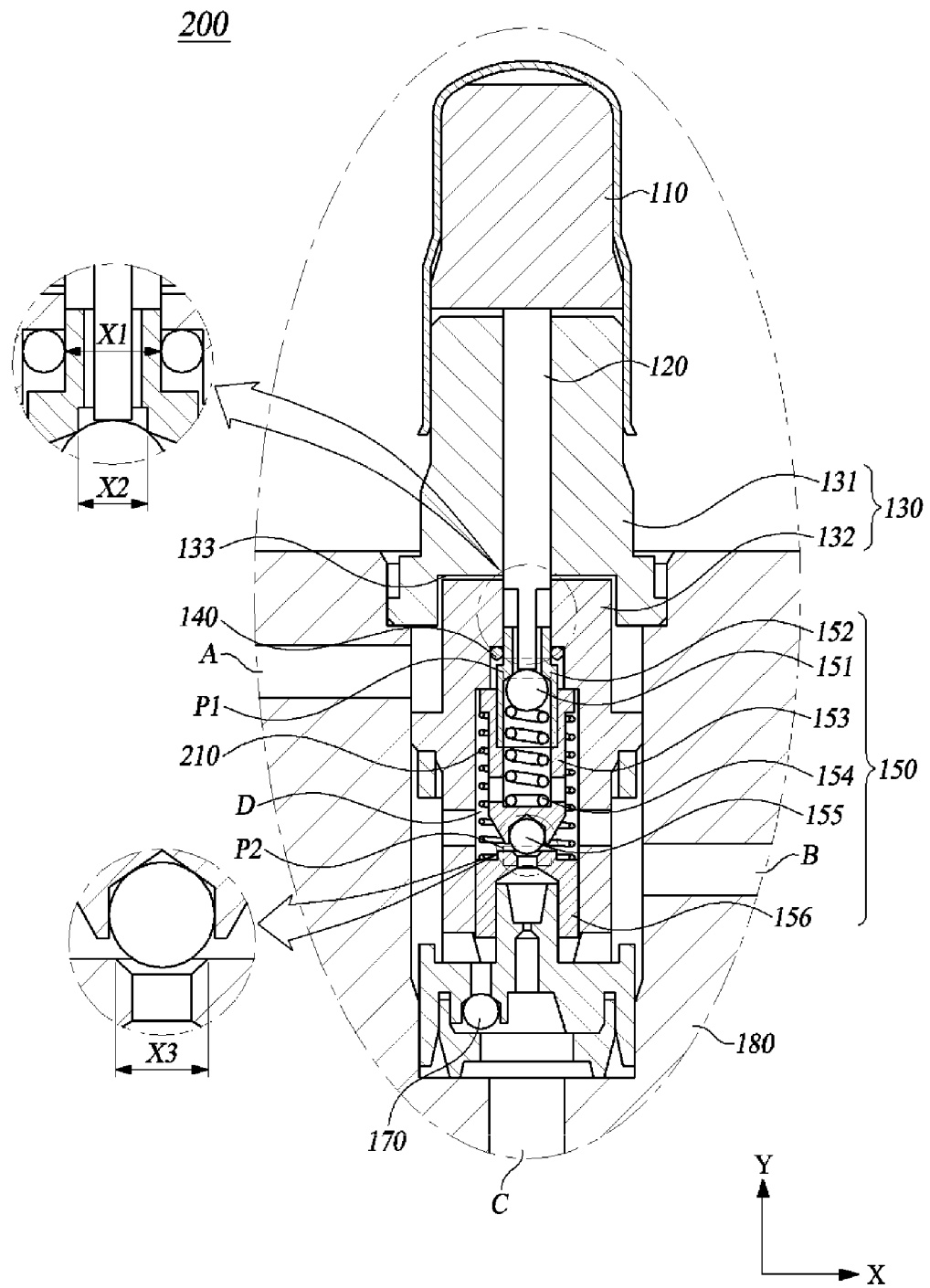
FIG. 7 is a cross-sectional view of a 3-way solenoid valve according to a second embodiment of the present disclosure.

FIG. 7 is a cross-sectional view of a three-way solenoid valve according to a second embodiment of the present disclosure.

Referring to FIG. 7, a three-way solenoid valve 200 according to the second embodiment includes the entirety or some of the armature 110, the plunger 120, the body 130, the sealing member 140, the flow path control assembly 150, a second elastic part 210, the check valve 170, and the valve block 180.

The three-way solenoid valve 200 according to the second embodiment and the solenoid valve 100 according to the first embodiment are different from each other in the shape of the housings 152 and 153. Other than that, the configuration and driving mechanism of the three-way solenoid valve 200 according to the second embodiment are substantially the same as those of the three-way solenoid valve 100 according to the first embodiment. Thus, the duplicated description will be omitted.

The second elastic part 210 may be disposed inside the valve chamber D, have one end in contact with an upper surface of the valve seat 156 and apply an elastic force to the housings 152 and 153 in the positive Y direction. The second elastic part 210 may be disposed to surround at least a portion of the flow path control assembly 150. The second elastic part 210 may be a spring. The elastic modulus of the second elastic part 210 may be lower than the elastic modulus of the first elastic part 154. The direction of the elastic force provided by the first elastic part 154 and the direction of the elastic force provided by the second elastic part 210 may be parallel to each other. The first elastic part 154 may be disposed inside the flow path control assembly 150, and the second elastic part 210 may be disposed to surround an outer peripheral surface of the flow path control assembly 150. The second elastic part 210 is not necessarily included only in the three-way solenoid valve 200 according to the second embodiment but may also be included in the three-way solenoid valve 100 according to the first embodiment. For example, in the three-way solenoid valve 100 according to the first embodiment, the second elastic part 210 may be disposed so that one side thereof is in contact with the housings 152 and 153 and the other side thereof is in contact with the valve seat 156.

Hereinafter, in the description of FIGS. 8 to 11, the first port A refers to a port that is directly or indirectly connected to the accumulator or the reservoir (not illustrated). The second port B refers to a port directly or indirectly connected to the wheel cylinder W1, W2, W3, or W4. The third port C refers to a port directly or indirectly connected to the pressurizer.

Figure 8:
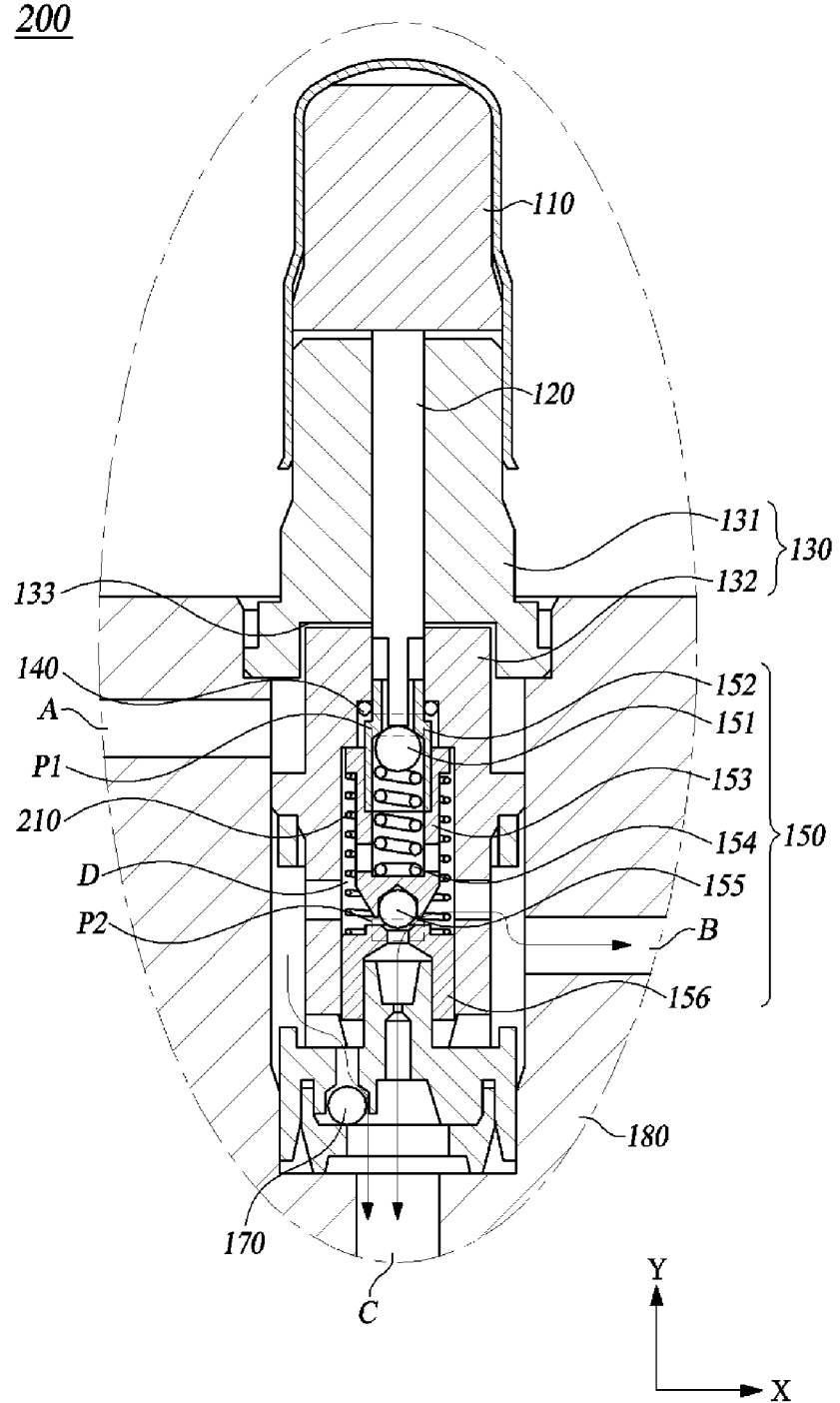
FIG. 8 is a cross-sectional view for explaining the flow of a fluid when electromagnetic force is not formed in the armature of the 3-way solenoid valve according to the second embodiment of the present disclosure.

Referring to FIG. 8, when the electromagnetic force is not formed in the armature 110, the armature 110 does not press the plunger 120.

An upper end of the lower housing 153 according to the second embodiment is bent in a radial direction of the housing. The durability of the plunger 120 in the armature 110 can be improved due to the shape of the lower housing 153. While the second opening/closing flow path P2 is opened, the lower housing 153 moves in the positive Y direction. The lower housing 153 according to the first embodiment presses the plunger 120 while moving in the positive Y direction. Unlike this, an upper surface bent at an upper end of the lower housing 153 according to the second embodiment is caught by a portion of the second body 132, and thus the flow path control assembly 150 may be fixed. As a result, when the electromagnetic force is not formed in the armature 110, there is no force for pressing the plunger 120, and thus the durability of the plunger 120 is improved.

In the three-way solenoid valve 200 according to the second embodiment of the present disclosure, when no current is applied to the coil, the second opening/closing flow path P2 is opened, and the first opening/closing flow path P1 is closed. Thus, the three-way solenoid valve 200 according to the second embodiment of the present disclosure functions as a normal open-type inlet valve and a normal closed-type outlet valve according to the related art.

Figure 9:
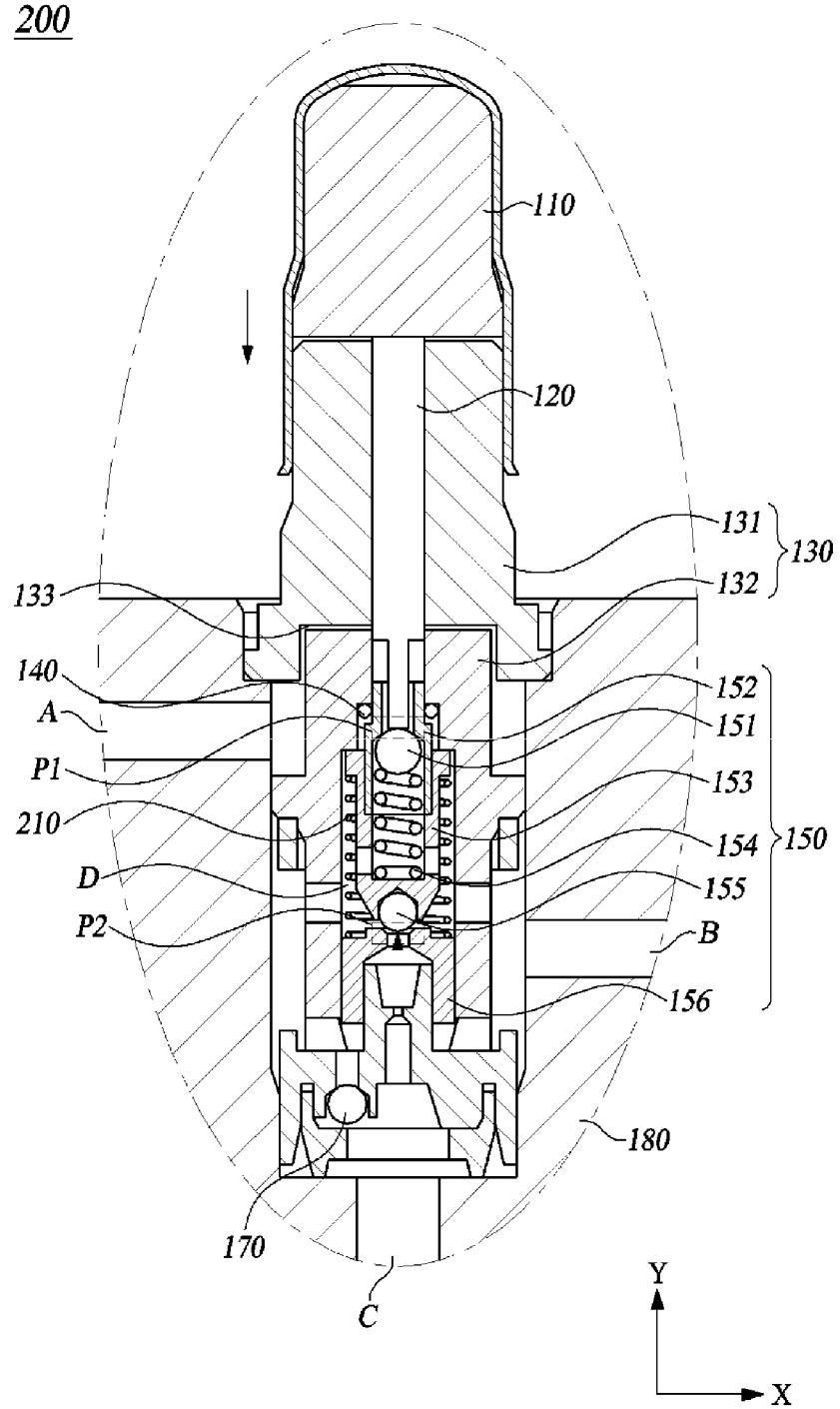
FIG. 9 is a cross-sectional view for explaining the flow of a fluid when a second electromagnetic force is formed in the armature of the 3-way solenoid valve according to the second embodiment of the present disclosure.

Referring to FIG. 9, the armature 110 presses the plunger 120 with a force corresponding to the second electromagnetic force. Here, the second electromagnetic force is set to be greater than the sum of a force that is applied to the flow path control assembly 150 by the fluid flowing into the third port C and a force that is applied to the flow path control assembly 150 by the fluid flowing into the second port B. Here, the force that is applied to the flow path control assembly 150 by the fluid flowing into the third port C is caused by a pressure applied to the third area X3 by the fluid flowing into the third port C. The force applied to the flow path control assembly 150 by the fluid flowing into the second port B is caused by a pressure applied to the first area X1 by the fluid flowing into the second port B and a pressure applied to the third area X3 by the fluid flowing into the second port B. In addition, the second electromagnetic force is set to be smaller than a force obtained by adding a force applied to the second area X2 by the fluid flowing into the second port B and the elastic force of the first elastic part 154. The armature 110, in which the second electromagnetic force is formed, indirectly presses the second fluid control unit 155 to close the second opening/closing flow path P2. A force with which the armature 110 in which the second electromagnetic force is formed presses the first elastic part 154 is not large enough to deform the first elastic part 154, and thus the first opening/closing flow path P1 is also closed.

When the second electromagnetic force is formed in the armature 110, the second opening/closing flow path P2 is closed, and thus the fluid pressed in the pressurizer is not transferred to the wheel cylinder W1, W2, W3, or W4. Since the first opening/closing flow path P1 is closed, the fluid inside the wheel cylinder W1, W2, W3, or W4 is not transferred to the accumulator. Accordingly, when the second electromagnetic force is formed in the armature 110, the hydraulic pressure inside the wheel cylinder W1, W2, W3, or W4 is maintained. The flow path connection state illustrated in FIG. 9 corresponds to a flow path connection state when both the inlet valve and the outlet valve are closed in the general vehicular braking device. In order to maintain the braking pressure of the wheel cylinder W1, W2, W3, or W4, the three-way solenoid valve 200 may be driven as illustrated in FIG. 9.

Figure 10:
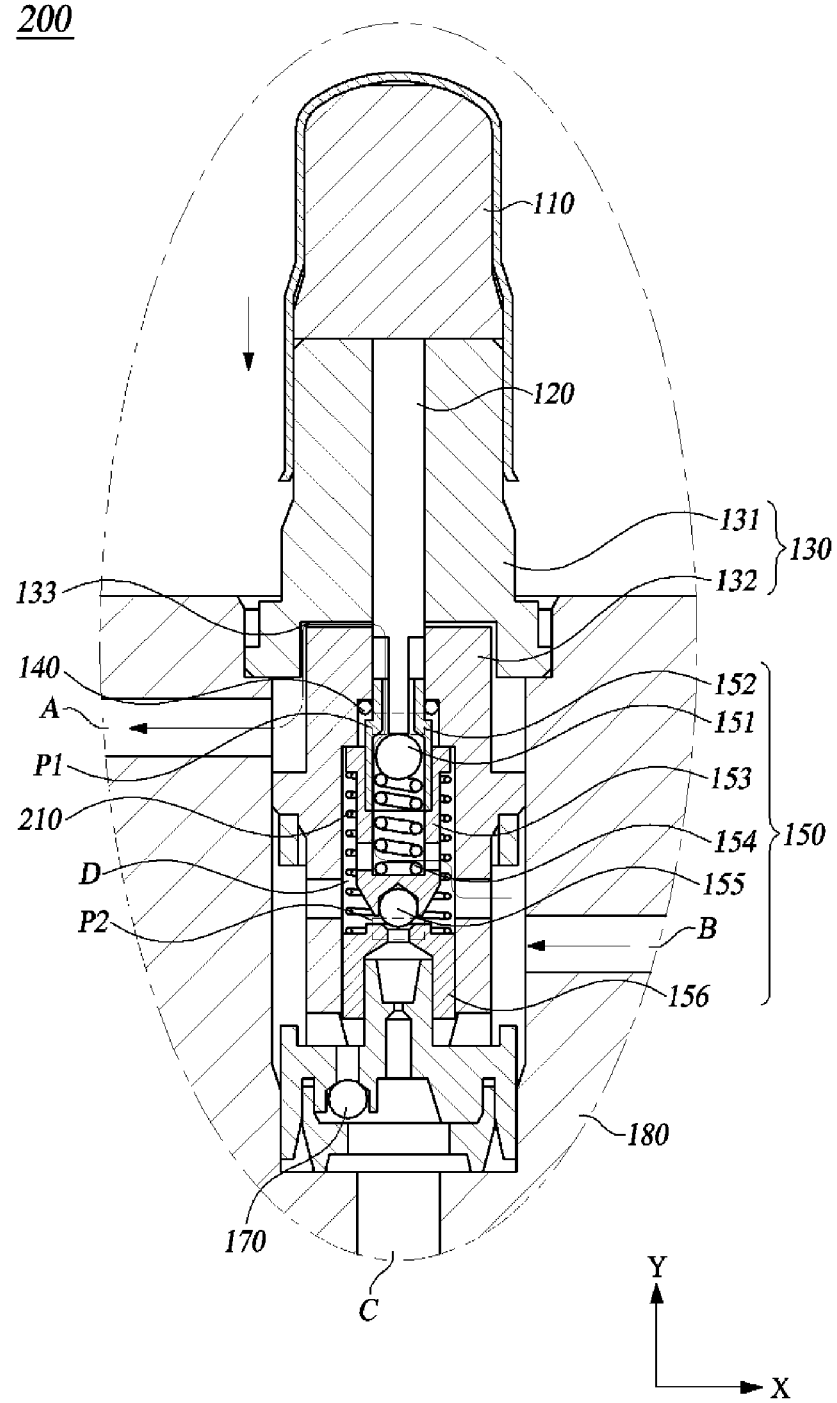
FIG. 10 is a cross-sectional view for explaining the flow of a fluid when a third electromagnetic force is formed in the armature of the 3-way solenoid valve according to the second embodiment of the present disclosure.

Referring to FIG. 10, the armature 110 presses the plunger 120 using a force corresponding to the third electromagnetic force. The third electromagnetic force is set to be greater than a force obtained by adding a force applied to the second area X2 by the fluid flowing into the second port B and the elastic force of the first elastic part 154. The armature 110, in which the third electromagnetic force is formed, indirectly presses the second fluid control unit 155 to close the second opening/closing flow path P2. As the armature 110 indirectly presses the first elastic part 154 to compress the first elastic part 154, the first opening/closing flow path P1 is opened. When the third electromagnetic force is formed in the armature 110, the second opening/closing flow path P2 is closed, and thus the fluid pressed in the pressurizer is not transferred to the wheel cylinder W1, W2, W3, or W4. Since the first opening/closing flow path P1 is opened, the fluid inside the wheel cylinder W1, W2, W3, or W4 sequentially passes through the second port B and the first port A and is transferred to the accumulator or the reservoir. Accordingly, when the third electromagnetic force is formed in the armature 110, the hydraulic pressure inside the wheel cylinder W1, W2, W3, or W4 is reduced. The flow path connection state illustrated in FIG. 10 corresponds to a flow path connection state when the inlet valve is closed and the outlet valve is opened in the general vehicular braking device. In order to reduce the braking pressure of the wheel cylinder W1, W2, W3, or W4, the three-way solenoid valve 200 may be driven as illustrated in FIG. 5.

Figure 11:
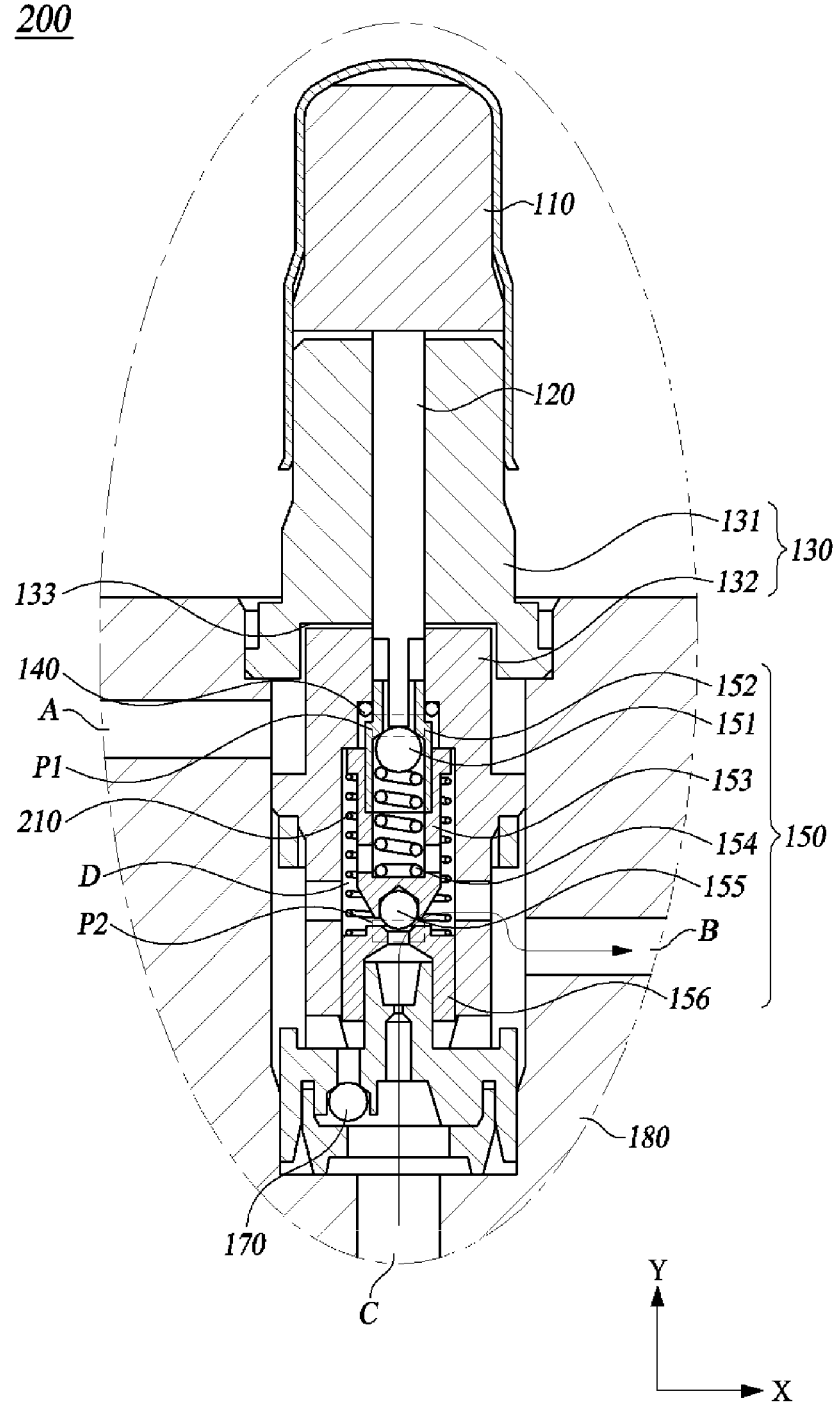
FIG. 11 is a cross-sectional view for explaining the flow of a fluid when a first electromagnetic force is formed in the armature of the 3-way solenoid valve according to the second embodiment of the present disclosure.

Referring to FIG. 11, the armature 110 presses the plunger 120 with a force corresponding to the first electromagnetic force. The first electromagnetic force may be set to be smaller than the second electromagnetic force. A force with which the armature 110, in which the first electromagnetic force is formed, indirectly presses the second fluid control unit 155 is lower than a force applied to the second fluid control unit 155 by the fluid flowing into the third port C. Thus, the second opening/closing flow path P2 is not completely closed, and the fluid flows from the third port C to the second port B. The first opening/closing flow path P1 is closed. When the first electromagnetic force is formed in the armature 110, the second opening/closing flow path P2 is partially opened, and thus the fluid pressed by the pressurizer sequentially passes through the third port C and the second port B and is transferred to the wheel cylinder W1, W2, W3, or W4. Since the first opening/closing flow path P1 is closed, the fluid inside the wheel cylinder W1, W2, W3, or W4 is not transferred to the accumulator or the reservoir via the first port A from the second port B. Accordingly, when the first electromagnetic force is formed in the armature 110, the hydraulic pressure inside the wheel cylinder W1, W2, W3, or W4 is increased. The flow path connection state illustrated in FIG. 11 corresponds to a flow path connection state when the inlet valve is opened and the outlet valve is closed in the general vehicular braking device. In order to increase the braking pressure of the wheel cylinder W1, W2, W3, or W4, the three-way solenoid valve 200 may be driven as illustrated in FIG. 11.

When the three-way solenoid valve 200 is driven as illustrated in FIG. 11, the pressure of the wheel cylinder W1, W2, W3, or W4 increases sharply, and thus the wheel-slip phenomenon or the wheel-lock phenomenon may occur. In order to prevent the wheel-slip phenomenon or the wheel-lock phenomenon, the first electromagnetic force corresponding to a force just before the first opening/closing flow path P1 is opened is formed in the armature 110, and thereafter, the first electromagnetic force is linearly reduced to gradually increase the hydraulic pressure of the wheel cylinder W1, W2, W3, or W4.

According to one embodiment, an electric brake has the effect of estimating a clamping force with high accuracy by estimating the clamping force on the basis of a location of a piston at which a specific current value is detected.

According to one embodiment, the electric brake has the effect of more accurately calculating a braking force by calculating the braking force in consideration of hysteresis characteristics of the braking force with respect to the location of the piston.

What is claimed is:

1. A three-way solenoid valve comprising:
a valve block including a valve chamber and a first port, a second port, and a third port fluidly communicating with the valve chamber;
an armature configured to provide an electromagnetic force;
a body including a first body having one side facing the armature and a hollow therein, and a second body having one side facing another side of the first body and a hollow therein;
a plunger of which at least a portion passes through the hollows inside the first body and the second body and of which one end is configured to be pressed by the armature so that the plunger moves in a lengthwise direction of the three-way solenoid; and
a flow path control assembly that is disposed inside the second body and includes a first opening/closing flow path, which allows the first port and the second port to fluidly communicate with each other or to be blocked from each other according to a magnitude of a force applied by the plunger, and a second opening/closing flow path which allows the second port and the third port to fluidly communicate with each other or to be blocked from each other according to the magnitude of the force applied by the plunger,
wherein in one cross section of the three-way solenoid valve, the first body and the second body are entirely spaced apart from each other to have a discharge flow path between the first body and the second body, such that the first body and the second body do not entirely contact each other in the one cross section of the three-way solenoid valve,
the discharge flow path extends away or towards the plunger so as to be connected to the first port, and
the first body and the second body do not contact each other on any surface.

2. The three-way solenoid valve of claim 1, wherein a groove in a lower end of the first body facing the second body and an upper surface of the second body facing the first body are configured as an outer peripheral surface of the discharge flow path.

3. The three-way solenoid valve of claim 1, wherein a groove in an upper end of the second body and a lower surface of the first body facing the second body are configured as an outer peripheral surface of the discharge flow path.

4. The three-way solenoid valve of claim 1, wherein a flange portion for fixing the first body to the valve chamber is disposed on a lower end of the first body.

5. The three-way solenoid valve of claim 1, wherein the armature is configured to provide a first electromagnetic force, a second electromagnetic force that is greater than the first electromagnetic force, and a third electromagnetic force that is greater than the second electromagnetic force, and
opening/closing states of the first opening/closing flow path and the second opening/closing flow path are controlled according to the electromagnetic force provided by the armature.

6. The three-way solenoid valve of claim 5, wherein, when the armature presses the plunger using the first electromagnetic force, the first opening/closing flow path is closed and the second opening/closing flow path is opened.

7. The three-way solenoid valve of claim 5, wherein, when the armature presses the plunger using the second electromagnetic force, the first opening/closing flow path and the second opening/closing flow path are closed.

8. The three-way solenoid valve of claim 5, wherein, when the armature presses the plunger using the third electromagnetic force, the first opening/closing flow path is opened and the second opening/closing flow path is closed.

9. The three-way solenoid valve of claim 1, wherein, when the armature does not press the plunger, the second opening/closing flow path is opened due to pressures of the second port and the third port.

10. The three-way solenoid valve of claim 1, wherein an amount of fluid flowing between the first port, the second port, and the third port changes according to the electromagnetic force applied to the armature.

11. The three-way solenoid valve of claim 1, further comprising a check valve configured to allow a fluid to flow only from the second port toward the third port.

12. A three-way solenoid valve comprising:
a valve block including a valve chamber and a first port, a second port, and a third port fluidly communicating with the valve chamber;
an armature configured to provide an electromagnetic force;
a body including a first body having one side facing the armature and a hollow therein, and a second body having one side facing another side of the first body and a hollow therein;
a plunger of which at least a portion passes through the hollows inside the first body and the second body and of which one end is configured to be pressed by the armature so that the plunger moves; and
a flow path contorl assembly that is disposed inside the second body and includes a first opening/closing flow path, which allows the first port and the second port to fluidly communicate with each other or to be blocked from each other according to a magnitude of a force applied by the plunger, and a second opening/closing flow path which allows the second port and the third port to fluidly communicate with each other or to be blocked from each other according to the magnitude of the force applied by the plunger,
wherein the first body and the second body are spaced apart from each other in one region to have a discharge flow path between the first body and the second body,
a groove portion which is concave upward is disposed in a lower surface of the first body facing the second body, and
at least a portion of the second body is accommodated in the groove portion and is spaced apart from the first body in the groove portion to have the discharge flow path between the first body and the second body.

13. A three-way solenoid valve comprising:
a valve block including a valve chamber and a first port, a second port, and a third port fluidly communicating with the valve chamber;
an armature configured to provide an electromagnetic force;
a body including a first body having one side facing the armature and a hollow therein, and a second body having one side facing another side of the first body and a hollow therein;
a plunger of which at least a portion passes through the hollows inside the first body and the second body and of which one end is configured to be pressed by the armature so that the plunger moves; and
a flow path control assembly that is disposed inside the second body and includes a first opening/closing flow path, which allows the first port and the second port to fluidly communicate with each other or to be blocked from each other according to a magnitude of a force applied by the plunger, and a second opening/closing flow path which allows the second port and the third port to fluidly communicate with each other or to be blocked from each other according to the magnitude of the force applied by the plunger,
wherein the armature is configured to provide a first electromagnetic force, a second electromagnetic force that is greater than the first electromagnetic force, and a third electromagnetic force that is greater than the second electromagnetic force,
opening/closing states of the first opening/closing flow path and the second opening/closing flow path are controlled according to the electromagnetic force provided by the armature, and
when the armature presses the plunger using the third electromagnetic force, the first opening/closing flow path is opened and the second opening/closing flow path is closed.

* * * * *